US012608731B2

(12) United States Patent
Qian et al.

(10) Patent No.: US 12,608,731 B2
(45) Date of Patent: Apr. 21, 2026

(54) PROMOTING APIS BASED ON USAGE

(71) Applicant: Dell Products L.P., Round Rock, TX (US)

(72) Inventors: Ming Qian, Brighton, MA (US); Robert Alan Barrett, Austin, TX (US); Alexander Rote, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 493 days.

(21) Appl. No.: 18/183,635

(22) Filed: Mar. 14, 2023

(65) Prior Publication Data

US 2024/0311881 A1 Sep. 19, 2024

(51) Int. Cl.
G06Q 30/0283 (2023.01)
G06F 9/54 (2006.01)

(52) U.S. Cl.
CPC ......... G06Q 30/0283 (2013.01); G06F 9/541 (2013.01)

(58) Field of Classification Search
None
See application file for complete search history.

(56) References Cited

U.S. PATENT DOCUMENTS

| | | | | |
|---|---|---|---|---|
| 9,886,247 | B2 * | 2/2018 | Laredo | G06F 16/2455 |
| 10,929,211 | B1 * | 2/2021 | Mylavarapu | G06F 11/3466 |
| 2016/0104067 | A1 * | 4/2016 | Xu | H04L 67/306 |
| | | | | 706/46 |

| | | | | |
|---|---|---|---|---|
| 2016/0125042 | A1 * | 5/2016 | Laredo | G06F 16/2455 |
| | | | | 707/723 |
| 2016/0239546 | A1 * | 8/2016 | Cuomo | G06F 16/9538 |
| 2017/0060654 | A1 * | 3/2017 | Nandakumar | H04L 43/12 |
| 2017/0068577 | A1 * | 3/2017 | Ashokan | G06Q 20/123 |
| 2017/0090914 | A1 * | 3/2017 | Pandey | G06F 9/44536 |
| 2017/0277756 | A1 * | 9/2017 | Masuda | G06F 9/5072 |
| 2018/0129544 | A1 * | 5/2018 | Ekambaram | G06F 9/541 |
| 2019/0129764 | A1 * | 5/2019 | Johnson | G06N 7/01 |

(Continued)

FOREIGN PATENT DOCUMENTS

| | | | | | |
|---|---|---|---|---|---|
| CN | 109144498 | A | * | 1/2019 | G06F 8/34 |
| CN | 109753275 | A | * | 5/2019 | G06F 8/20 |

(Continued)

OTHER PUBLICATIONS

Chen "Automatic Parameter Recommendation for Practical API Usage" Aug. 2025 pp. 1-12.*

*Primary Examiner* — Charles E Anya
(74) *Attorney, Agent, or Firm* — Amin, Turocy & Watson, LLP

(57) ABSTRACT

A system can assign respective first elements of a first application programming interface (API) to respective first objects in a graph representation, wherein the respective objects correspond to respective syntactic representations of the first API. The system can determine that an action, taken with respect to a user account, has invoked a second API via an API call, wherein respective second elements of the second API are assigned to respective second objects in the graph representation. The system can determine that the first API satisfies a first similarity criterion with respect to the second API. The system can determine that the first API is superior to the second API according to a second criterion. The system can send, for access via the user account, an indication of the second API.

20 Claims, 14 Drawing Sheets

900

902

ASSIGNING RESPECTIVE FIRST ELEMENTS OF A FIRST API TO RESPECTIVE FIRST OBJECTS IN A GRAPH REPRESENTATION, WHEREIN THE RESPECTIVE OBJECTS CORRESPOND TO RESPECTIVE SYNTACTIC REPRESENTATIONS OF THE FIRST API 904

DETERMINING THAT AN ACTION, TAKEN WITH RESPECT TO A USER ACCOUNT, HAS INVOKED A SECOND API VIA AN API CALL, WHEREIN RESPECTIVE SECOND ELEMENTS OF THE SECOND API ARE ASSIGNED TO RESPECTIVE SECOND OBJECTS IN THE GRAPH REPRESENTATION 906

DETERMINING THAT THE FIRST API SATISFIES A FIRST SIMILARITY CRITERION WITH RESPECT TO THE SECOND API 908

DETERMINING THAT THE FIRST API IS SUPERIOR TO THE SECOND API ACCORDING TO A SECOND CRITERION 910

SENDING, FOR ACCESS VIA THE USER ACCOUNT, AN INDICATION OF THE FIRST API 912

914

(56) References Cited

U.S. PATENT DOCUMENTS

| | | | | |
|---|---|---|---|---|
| 2019/0188276 A1* | 6/2019 | Anerousis | ............... | G06F 18/22 |
| 2019/0384856 A1* | 12/2019 | Liu | ........................ | G06F 40/284 |
| 2020/0159597 A1* | 5/2020 | Gino | ................ | G06F 16/24539 |
| 2020/0366572 A1* | 11/2020 | Chauhan | ............. | H04L 41/5009 |
| 2021/0044672 A1* | 2/2021 | Gilling | .................. | H04L 67/535 |
| 2024/0113978 A1* | 4/2024 | Ali | ..................... | H04L 47/2425 |

FOREIGN PATENT DOCUMENTS

| | | | | | |
|---|---|---|---|---|---|
| CN | 116400910 A | * | 7/2023 | .............. | G06F 8/34 |
| JP | 2017142640 A | * | 8/2017 | ............. | G06F 17/00 |

* cited by examiner

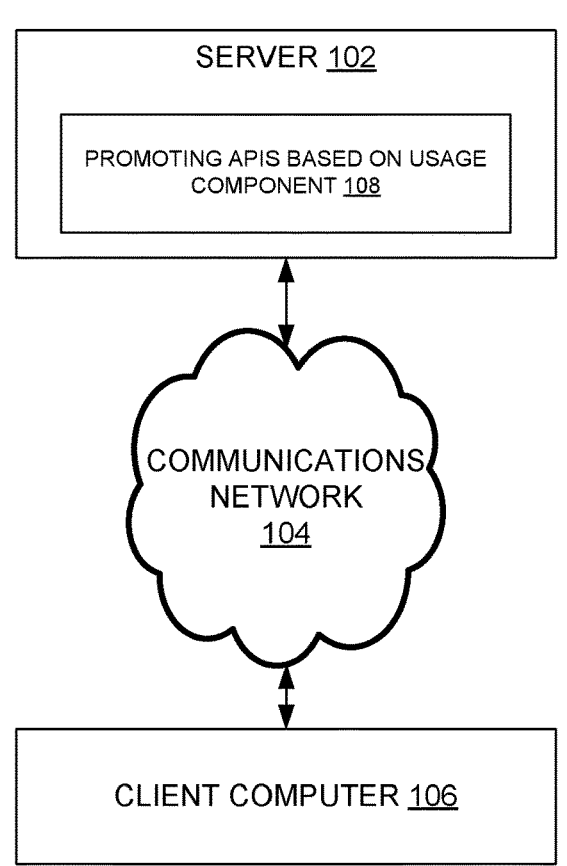
SERVER 102
PROMOTING APIS BASED ON USAGE COMPONENT 108
COMMUNICATIONS NETWORK 104
CLIENT COMPUTER 106
FIG. 1

300
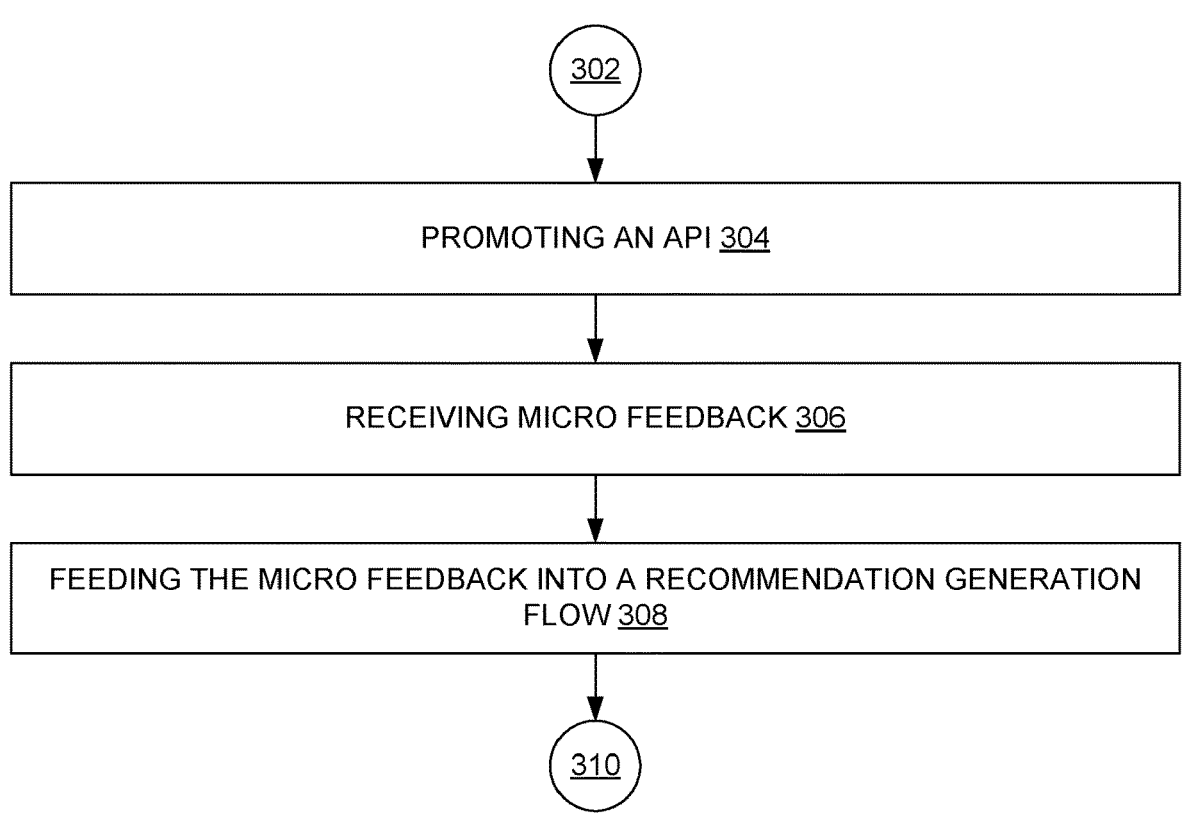
302
PROMOTING AN API 304
RECEIVING MICRO FEEDBACK 306
FEEDING THE MICRO FEEDBACK INTO A RECOMMENDATION GENERATION FLOW 308
310
FIG. 3

400

404

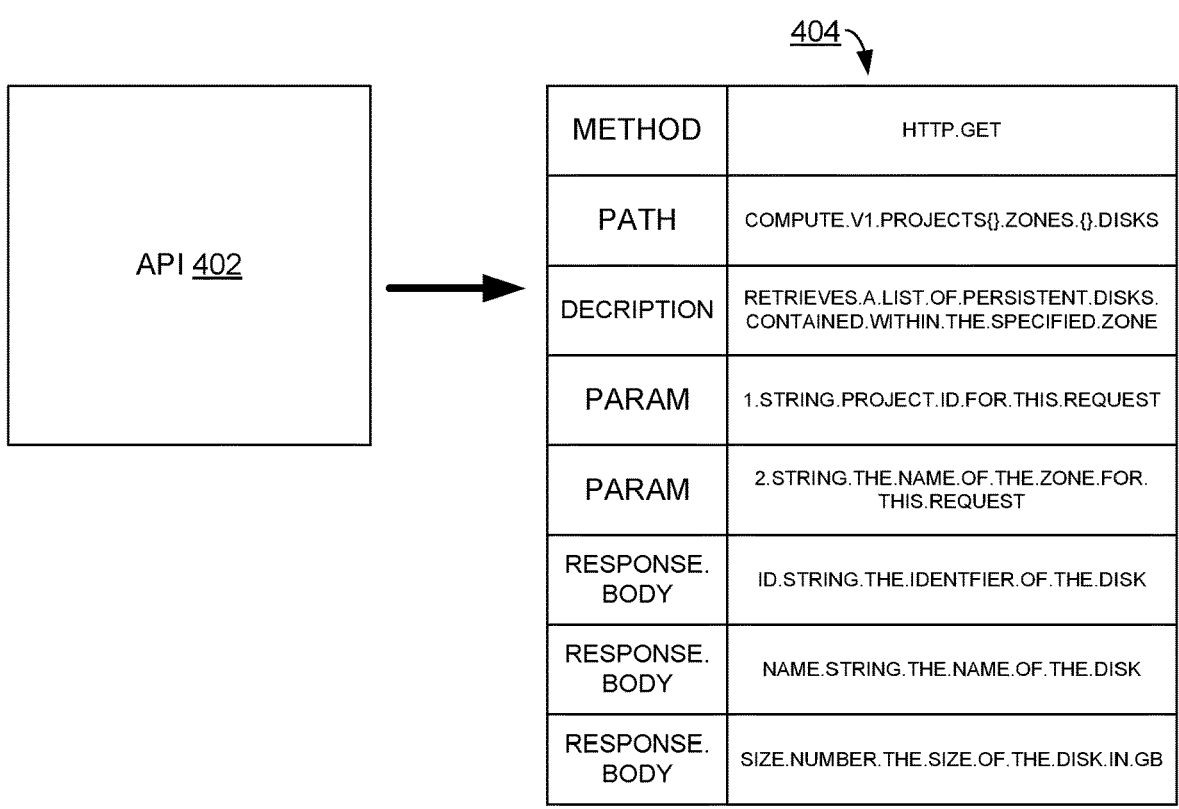

| METHOD | HTTP.GET |
| --- | --- |
| PATH | COMPUTE.V1.PROJECTS{}.ZONES.{}.DISKS |
| DECRIPTION | RETRIEVES.A.LIST.OF.PERSISTENT.DISKS. CONTAINED.WITHIN.THE.SPECIFIED.ZONE |
| PARAM | 1.STRING.PROJECT.ID.FOR.THIS.REQUEST |
| PARAM | 2.STRING.THE.NAME.OF.THE.ZONE.FOR. THIS.REQUEST |
| RESPONSE. BODY | ID.STRING.THE.IDENTFIER.OF.THE.DISK |
| RESPONSE. BODY | NAME.STRING.THE.NAME.OF.THE.DISK |
| RESPONSE. BODY | SIZE.NUMBER.THE.SIZE.OF.THE.DISK.IN.GB |

API 402

PROMOTING APIS BASED ON USAGE
COMPONENT 708

| TIMESTAMP 702 | API AND ITS SELECTOR 704 | USER INFO (ID) 706 |

| PROMOTING APIS BASED ON USAGE COMPONENT 808 |
|---|

API 1
802

| RESPONSE TIME PER CALL 804A | 500 MS |
|---|---|
| NUMBER OF CALLS 806A | 3 |
| NUMBER OF USERS 808A | 5,000 |
| TOTAL TIME 810A | 7,500 SEC |

API 2
804

| RESPONSE TIME PER CALL 804B | 600 MS |
|---|---|
| NUMBER OF CALLS 806B | 1 |
| NUMBER OF USERS 808B | 5,000 |
| TOTAL TIME 810B | 3,000 SEC |

900

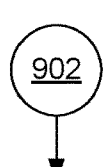

902

ASSIGNING RESPECTIVE FIRST ELEMENTS OF A FIRST API TO RESPECTIVE FIRST OBJECTS IN A GRAPH REPRESENTATION, WHEREIN THE RESPECTIVE OBJECTS CORRESPOND TO RESPECTIVE SYNTACTIC REPRESENTATIONS OF THE FIRST API 904

DETERMINING THAT AN ACTION, TAKEN WITH RESPECT TO A USER ACCOUNT, HAS INVOKED A SECOND API VIA AN API CALL, WHEREIN RESPECTIVE SECOND ELEMENTS OF THE SECOND API ARE ASSIGNED TO RESPECTIVE SECOND OBJECTS IN THE GRAPH REPRESENTATION 906

DETERMINING THAT THE FIRST API SATISFIES A FIRST SIMILARITY CRITERION WITH RESPECT TO THE SECOND API 908

DETERMINING THAT THE FIRST API IS SUPERIOR TO THE SECOND API ACCORDING TO A SECOND CRITERION 910

SENDING, FOR ACCESS VIA THE USER ACCOUNT, AN INDICATION OF THE FIRST API 912

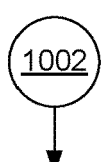

1002

ASSIGNING RESPECTIVE FIRST ELEMENTS OF A FIRST API TO RESPECTIVE FIRST OBJECTS IN A GRAPH REPRESENTATION, WHEREIN THE RESPECTIVE OBJECTS CORRESPOND TO RESPECTIVE SYNTACTIC REPRESENTATIONS OF THE FIRST API 1004

DETERMINING THAT A USER ACCOUNT HAS INVOKED A SECOND API VIA AN API CALL, WHEREIN RESPECTIVE SECOND ELEMENTS OF THE SECOND API ARE ASSIGNED TO RESPECTIVE SECOND OBJECTS IN THE GRAPH REPRESENTATION 1006

DETERMINING THAT THE FIRST API HAS A CAPABILITY NOT POSSESSED BY THE SECOND API ACCORDING TO A CRITERION 1008

SENDING, TO THE USER ACCOUNT, AN INDICATION OF THE FIRST API 1010

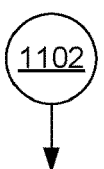

1102

IN RESPONSE TO RECEIVING THE API CALL, INVOKING AN ASYNCHRONOUS PROCESS THAT CAPTURES STATISTICS ABOUT THE API CALL, WHEREIN THE DETERMINING THAT THE USER ACCOUNT HAS INVOKED THE SECOND API IS BASED ON THE STATISTICS 1104

WHEREIN THE STATISTICS ARE FIRST STATISTICS, AND WHEREIN THE ASYNCHRONOUS PROCESS IS A FIRST ASYNCHRONOUS PROCESS, AFTER PROCESSING THE API CALL, INVOKING A SECOND ASYNCHRONOUS PROCESS THAT CAPTURES SECOND STATISTICS ABOUT THE API CALL, WHEREIN THE DETERMINING THAT THE USER ACCOUNT HAS INVOKED THE SECOND API IS BASED ON THE SECOND STATISTICS 1106

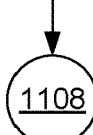

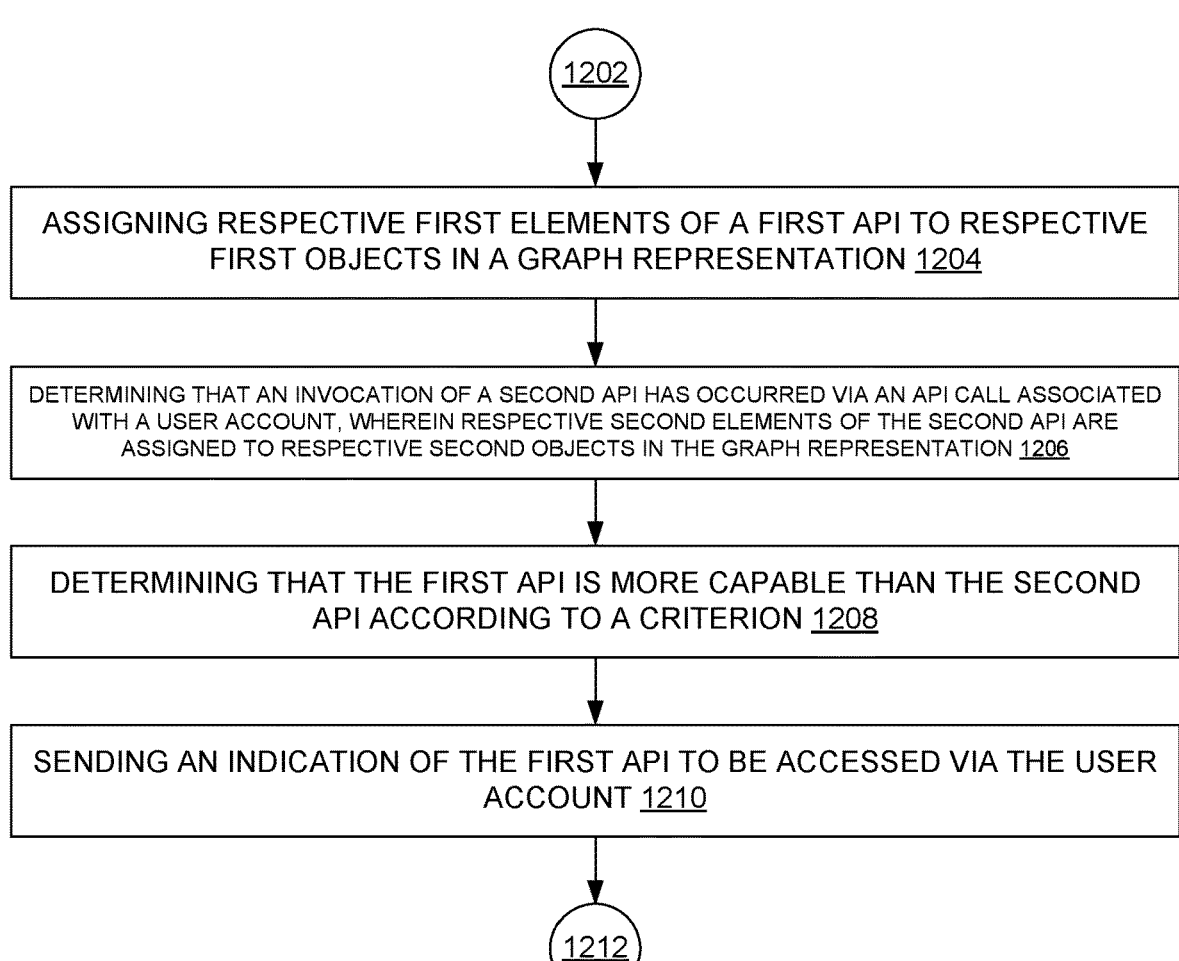

1202

ASSIGNING RESPECTIVE FIRST ELEMENTS OF A FIRST API TO RESPECTIVE FIRST OBJECTS IN A GRAPH REPRESENTATION 1204

DETERMINING THAT AN INVOCATION OF A SECOND API HAS OCCURRED VIA AN API CALL ASSOCIATED WITH A USER ACCOUNT, WHEREIN RESPECTIVE SECOND ELEMENTS OF THE SECOND API ARE ASSIGNED TO RESPECTIVE SECOND OBJECTS IN THE GRAPH REPRESENTATION 1206

DETERMINING THAT THE FIRST API IS MORE CAPABLE THAN THE SECOND API ACCORDING TO A CRITERION 1208

SENDING AN INDICATION OF THE FIRST API TO BE ACCESSED VIA THE USER ACCOUNT 1210

AFTER THE SENDING OF THE INDICATION OF THE SECOND API, RECEIVING FEEDBACK DATA FROM THE USER ACCOUNT 1304

UPDATING DATA UPON WHICH THE CRITERION IS BASED, BASED ON THE FEEDBACK DATA 1306

1308

PROMOTING APIS BASED ON USAGE

BACKGROUND

A computer component can expose an application programming interface (API) that can be invoked to cause the component to perform a task.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can assign respective first elements of a first API to respective first objects in a graph representation, wherein the respective objects correspond to respective syntactic representations of the first API. The system can determine that an action, taken with respect to a user account, has invoked a second API via an API call, wherein respective second elements of the second API are assigned to respective second objects in the graph representation. The system can determine that the first API satisfies a first similarity criterion with respect to the second API. The system can determine that the first API is superior to the second API according to a second criterion. The system can send, for access via the user account, an indication of the second API.

An example method can comprise assigning, by a system comprising a processor, respective first elements of a first API to respective first objects in a graph representation, wherein the respective objects correspond to respective syntactic representations of the first API. The method can further comprise determining, by the system, that a user account has invoked a second API via an API call, wherein respective second elements of the second API are assigned to respective second objects in the graph representation. The method can further comprise determining, by the system, that the first API has a capability not possessed by the second API according to a criterion. The method can further comprise sending, by the system to the user account, an indication of the second API.

An example non-transitory computer-readable medium can comprise instructions that, in response to execution, cause a system comprising a processor to perform operations. These operations can comprise assigning respective first elements of a first API to respective first objects in a graph representation. These operations can further comprise determining that an invocation of a second API has occurred via an API call associated with a user account, wherein respective second elements of the second API are assigned to respective second objects in the graph representation. These operations can further comprise determining that the first API is more capable than the second API according to a criterion. These operations can further comprise sending an indication of the second API to be accessed via the user account.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate promoting APIs based on usage, in accordance with an embodiment of this disclosure;

FIG. 3 illustrates an example process flow for recommendations that can facilitate promoting APIs based on usage, in accordance with an embodiment of this disclosure;

FIG. 4 illustrates an example object network creation that can facilitate promoting APIs based on usage, in accordance with an embodiment of this disclosure;

FIG. 7 illustrates another example system architecture that can facilitate promoting APIs based on usage, in accordance with an embodiment of this disclosure;

FIG. 9 illustrates an example process flow that can facilitate promoting APIs based on usage, in accordance with an embodiment of this disclosure;

FIG. 10 illustrates another example process flow that can facilitate promoting APIs based on usage, in accordance with an embodiment of this disclosure;

FIG. 11 illustrates another example process flow that can facilitate promoting APIs based on usage, in accordance with an embodiment of this disclosure;

FIG. 12 illustrates another example process flow that can facilitate promoting APIs based on usage, in accordance with an embodiment of this disclosure;

DETAILED DESCRIPTION

Overview

Figure 2:
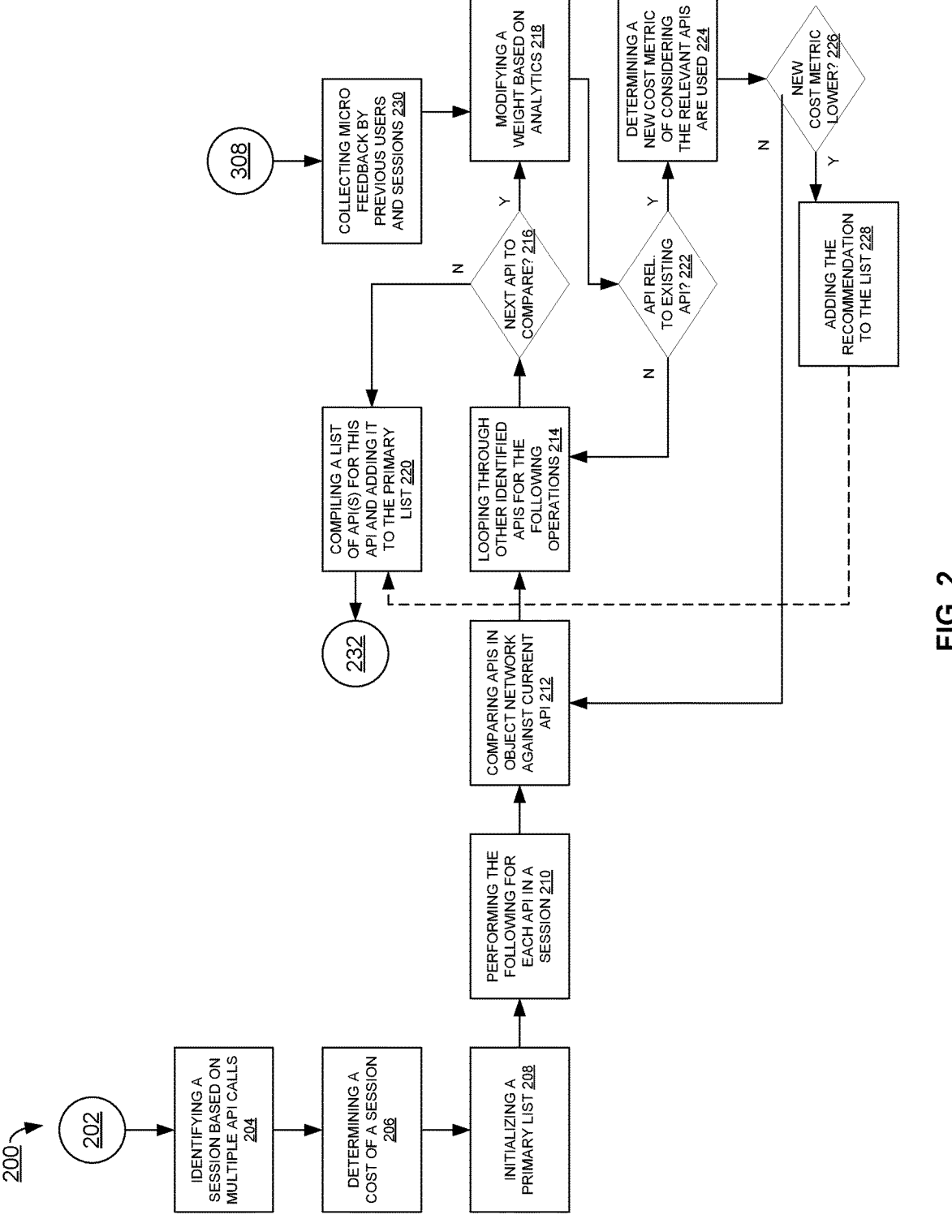
FIG. 2 illustrates an example process flow for recommendation generation that can facilitate promoting APIs based on usage, in accordance with an embodiment of this disclosure.

An application programming interface (API) can be a group of one or more commands that a computer component makes available for others to invoke to access the computer component. It can be that users of APIs can tend to continually use the APIs they have been using instead of looking for more efficient APIs that can better suit their needs. This can be due to reasons such as not learning about API updates, being unaware of better APIs, being unaware of benefits of other APIs, or missing key updated API versions.

This lack of switching to different APIs can lead to issues such as longer and more API calls to perform a function, more expensive API calls (in terms of computing resources, or time taken), worse API performance, and unrealized benefits of updating the API versions.

A solution to these problems can involve utilizing an object network to track end user usage of APIs, and to promote a different version of an API to a user while clearly expressing the benefits of the different version. In some examples, this API promotion can occur in an API developer portal, or a catalog, to improve effectiveness of the promotion.

One problem with prior approaches can be that users are missing key API updates, and the prior approaches to promoting the new APIs or updates are ineffective. Users can miss key updates because they are either unware of key API updates and newer versions, or lack a motivation to make the change.

Moreover, prior approaches to promote newer API versions through email newsletters can be ineffective. It can be that developers seldom read the newsletters, and that there is hesitation (and no incentive) to adopt an updated version of an API. Therefore, it can be that users tend to ignore those emails that are lost in the mix of all the emails they receive in a day.

Thus, without updating to a newest version of an API, it can be that the API experience is worse than it could otherwise be, and compromised. This can lead to lower user satisfaction, and potentially lead to lower user retention rate.

Another problem with prior approaches can be a lack of motivation to update or change existing used APIs. Changing an existing API could mean potentially breaking a corresponding computer program, and creating troubles to an existing fully-functional computer program. Moreover, it can be that users are unaware of benefits of updating or changing APIs, which can make those users even less motivated to update their existing APIs that are working fine. Therefore, it can be that users are unmotivated to make an updated to a fully-functional computer program. It can be that users make a change or update an API when they have no choice, or keep using an existing version of an API that is creating more issues than the potential issues in a new API.

Another problem with prior approaches can be a lack of awareness by users of benefits of updating or changing APIs, and in particular a lack of understanding of quantifiable benefits of updating or changing APIs. While users can be aware that there are new versions of an API available, and understand potential benefits of the new versions, it can be that the information provided to them is unclear so they do not understand the benefits in direct and quantifiable ways that could help users make easier decisions.

The present techniques can be implemented in a system represents APIs as a network of objects that have a semantic meaning, comprises a user analysis database that tracks API usage, and that is configured to forward recommendations to end users to meet their specific needs.

API promotion can occur in a developer portal or an API catalog to notify users, show benefits, and promote APIs to users.

An implementation of the present techniques can comprise two flows: a recommendation generation flow that comprises an object network, an analytics database, and user recommendation; and a recommendation flow.

The present techniques can be implemented to facilitate recommending APIs to users based on a current user's needs and API usage. An object network can be implemented that determines a relevancy of respective APIs. Data of API usage and other analytics can be used to interpret a developer's intent. The interpreted developer intent can be matched with an API that can fulfill it.

The present techniques can be implemented to facilitate providing calculated and clear benefits to motivate users to adopt recommended APIs. Users can be provided with a determined cost, time, and functionality benefits for proposed APIs, and have this information compared with current APIs. The present techniques can be used to recommend an API with benefits clearly shown and stated to users. This approach can lead to providing ongoing engagement with developers, which can lead developers to using specific recommended APIs more.

The present techniques can be implemented to promote APIs in a user-friendly environment, with micro-feedback. In prior approaches, API recommendations can be delivered through newsletters that users generally do not read. The present techniques can be implemented to provide promoted/recommended APIs in an API developer portal or an API catalog, with benefit clearly identified to reduce a possibility of users missing key updates of an API. An API can also be promoted along with a micro-feedback user interface element (e.g., a "thumbs up" button to indicate useful, and a "thumbs down" button to indicate not useful) to collect more data in regards to recommendations. This additional information can facilitate further training models to provide better and more accurate recommendations.

Consider the following example. Take two APIs that perform a similar task. API 1 can be "get port" (which returns a list of all port objects), and API 2 can be "get a port" (which returns a port by its ID).

Where an API 2 user has been using API 2 for a while, it can be that this API 2 user is unaware of the existence of API 1, so does not think that switching the API makes sense in his or her situation.

However, according to the present techniques, when the system detects that a user of API 2 keeps using API 2, and then aggregating the listed disks that are returned from the call, through analyzing the user's usage and intent, the system can prompt the user to switch to API 1 by expressing the benefits of switching (e.g., cost, time, data upgrade).

This approach can increase a chance that the API 2 user switches to using API 1, where API 1 does something very similar to API 2, but in a faster and more cost-effective way.

Example Architecture

FIG. 1 illustrates an example system architecture 100 that can facilitate promoting APIs based on usage, in accordance with an embodiment of this disclosure.

System architecture 100 comprises server 102, communications network 104, and client computer 106. In turn, server 102 comprises promoting APIs based on usage component 108, leader management node 110, and follower management nodes 112.

Figure 14:
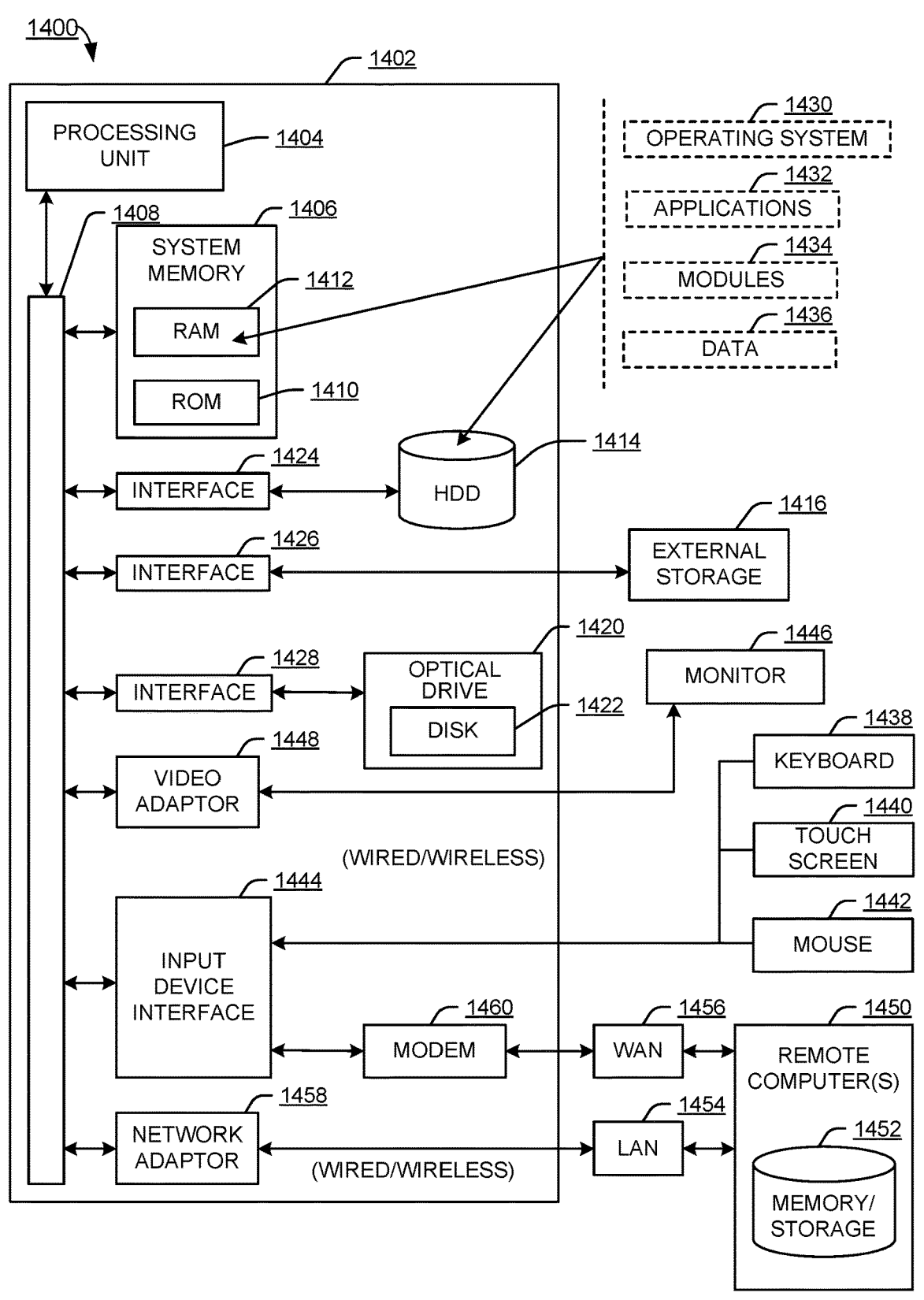
FIG. 14 illustrates an example block diagram of a computer operable to execute an embodiment of this disclosure.

Each of server 102 and/or client computer 106 can be implemented with part(s) of computing environment 1400 of FIG. 14. Communications network 104 can comprise a computer communications network, such as the Internet.

Promoting APIs based on usage component 108 can determine that client computer 106 is accessing a particular API. Promoting APIs based on usage component 108 can then determine one or more similar APIs to that API accessed by client computer 106, and determine a recommendation of another API to make to client computer, which can be better according to a metric (e.g., speed or cost).

In some examples, promoting APIs based on usage component 108 can implement part(s) of the process flows of FIGS. 2-3 and 9-13 to implement promoting APIs based on usage.

It can be appreciated that system architecture 100 is one example system architecture for promoting APIs based on usage, and that there can be other system architectures that facilitate promoting APIs based on usage.

Example Process Flows

FIG. 2 illustrates an example process flow 200 for recommendation generation that can facilitate promoting APIs based on usage, in accordance with an embodiment of this disclosure. In some examples, one or more embodiments of process flow 200 can be implemented by promoting APIs based on usage component 108 of FIG. 1, or computing environment 1400 of FIG. 14.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 300 of FIG. 3, process flow 900 of FIG. 9, process flow 1000 of FIG. 10, process flow 1100 of FIG. 11, process flow 1200 of FIG. 12, and/or process flow 1300 of FIG. 13.

Process flow 200 begins with 202, and moves to operation 204.

Operation 204 depicts identifying a session based on multiple API calls. In some examples, this can be performed using a timestamp, a selector, or user information.

After operation 204, process flow 200 moves to operation 206.

Operation 206 depicts determining a cost of a session based on number of calls and the cost of each API calls.

After operation 206, process flow 200 moves to operation 208.

Operation 208 depicts initializing a primary list.

After operation 208, process flow 200 moves to operation 210.

Operation 210 is reached from operation 208. Operation 210 depicts performing the following for each API in a session.

After operation 210, process flow 200 moves to operation 212.

Operation 212 is reached from operation 210, from operation 226 (where it is determined that the new cost metric is not lower than the existing API's cost. Operation 212 depicts comparing all APIs in a predefined object network against a current API in a session being evaluated to find other APIs with a sufficient weight.

After operation 212, process flow 200 moves to operation 214.

Operation 214 is reached from operation 214, operation 222 (where it is determined that the API is not relevant to the existing API). Operation 214 depicts looping through other identified APIs for the following operations.

After operation 214, process flow 200 moves to operation 216.

Operation 216 depicts determining whether there is a next API to compare.

Where in operation 216 it is determined that there is a next API to compare, process flow 200 moves to operation 218. Instead, where in operation 216 it is determined that there is a next API to compare, process flow 200 moves to operation 220.

Operation 218 is reached from operation 216 (where it is determined that there is a next API to compare), and operation 230. Operation 218 depicts modifying a weight based on analytics. This can comprise a selector. In some examples, operation 218 can be implemented using part(s) of system architecture 700 of FIG. 7.

After operation 218, process flow 200 moves to operation 222.

Operation 220 is reached from operation 216 where it is determined that there is not a next API to compare. Operation 220 depicts compiling a list of API(s) for this API and adding it to the primary list.

After operation 220, process flow 200 moves to 232, where process flow 200 ends.

Operation 222 depicts determining whether the API is relevant to the existing API.

Where it is determined in operation 222 that the API is relevant to the existing API, process flow 200 moves to operation 224. Instead, where it is determined in operation 222 that the API is not relevant to the existing API, process flow 200 returns to operation 214.

Operation 224 is reached from operation 222 where it is determined that the API is relevant to the existing API. Operation 224 depicts determining a new cost metric of considering the relevant APIs are used. Cost metrics (e.g., time, monetary cost, memory) can be determined based on metrics from existing data.

After operation 224, process flow 200 moves to operation 226.

Operation 226 depicts determining whether the new cost metric is lower than the existing API's cost.

Where in operation 226 it is determined that the new cost metric is lower than the existing API's cost, process flow 200 moves to operation 228. Instead, where in operation 226 it is determined that the new cost metric is not lower than the existing API's cost, process flow 200 returns to operation 212.

Operation 228 is reached from operation 226 where it is determined that the new cost metric is lower than the existing API's cost. Operation 228 depicts adding the recommendation to the list. This can be a list that is used to rank and promote the best recommended APIs.

After operation 228, process flow 200 moves to operation 220.

Operation 230 depicts collecting micro feedback by previous users and sessions. In some examples, an output of operation 308 of FIG. 3 can be input into process flow 200 at operation 230.

After operation 230, process flow 200 moves to operation 218.

FIG. 3 illustrates an example process flow 300 for recommendations that can facilitate promoting APIs based on usage, in accordance with an embodiment of this disclosure. In some examples, one or more embodiments of process flow 200 can be implemented by promoting APIs based on usage component 108 of FIG. 1, or computing environment 1400 of FIG. 14.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 300 of FIG. 3, process flow 900 of FIG. 9, process flow 1000 of FIG. 10, process flow 1100 of FIG. 11, process flow 1200 of FIG. 12, and/or process flow 1300 of FIG. 13.

Process flow 300 begins with 302, and moves to operation 304.

Operation 304 depicts promoting an API. This can comprise determining a recommended API, and promoting that API to a user account through a developer portal and/or an API catalog.

After operation 304, process flow 300 moves to operation 306.

Operation 306 depicts receiving micro feedback. This can be micro feedback received from a user account. The user account can be prompted to provide micro feedback (e.g., an indication of whether a recommendation for an API is "useful" or "not useful"). Micro feedback data can be received in response to this prompt.

After operation 306, process flow 300 moves to operation 308.

Operation 308 depicts feeding the micro feedback into a recommendation generation flow. This can be performed in a similar manner as operation 230 of FIG. 2. In some examples, an output of operation 308 can be input into operation 230 of FIG. 2.

After operation 308, process flow 300 moves to 310, where process flow 300 ends.

A recommendation flow can be implemented as follows. A recommend flow can be implemented to promote a best (or good) recommended API (based on, e.g., cost, time, and/or data upgrade benefit analysis) to the user through the API developer portal or the API catalog. The user can then have an ability to provide micro-feedback to indicate whether the recommended API is useful or not, and this feedback can be used to further train a model to provide better recommendations.

Example Object Network Creation

FIG. 4 illustrates an example object network creation 400 that can facilitate promoting APIs based on usage, in accordance with an embodiment of this disclosure. In some examples, part(s) of object network creation 400 can be implemented by promoting APIs based on usage component 108 of FIG. 1 to facilitate promoting APIs based on usage.

Object network creation 400 comprises API 402 and object network tokens for API 404. Object network tokens for API 404 can represent object network tokens that are generated from a schema of API 402. Tokens of object network tokens for API 404 can comprise a type of token (e.g., Method, Path), and a corresponding token (e.g., Http.Get).

An object can comprise a collection of tokens, where both an object and tokens serve to represent an API. "Object" can generally be used when referring to a representation of an API, and "token" can generally be used when referring to parts of an object, and how computations and comparisons are performed.

An object network can be implemented as follows. A system according to the present techniques can understand its own APIs as a network of related objects. Each API can be structurally reduced to a syntactic representation of the API. Each element of the API can be assigned as an individual object in a network. APIs that share syntactically identical elements can point to a same object in a network. The object can then be treated as a set of tokens that can be operated upon.

From this set of objects, a graph (e.g., such as in similarity determination 500 of FIG. 5) can be created that links the objects, based on a weight that represents a semantic similarity of two objects that are linked. The weight can be represented as a numeric value, where a higher value indicates that a relation between two objects are more similar, and a lower value indicates that a relation between two objects are less similar. This weight can be determined differently than a syntactic similarity, which can indicate whether two objects have the same structure. For example, a weight could have a high value between APIs that describe a color orange and a color red, and can have a low value between APIs that describe a color orange and a fruit orange.

Example Similarity Determination

Figure 5:
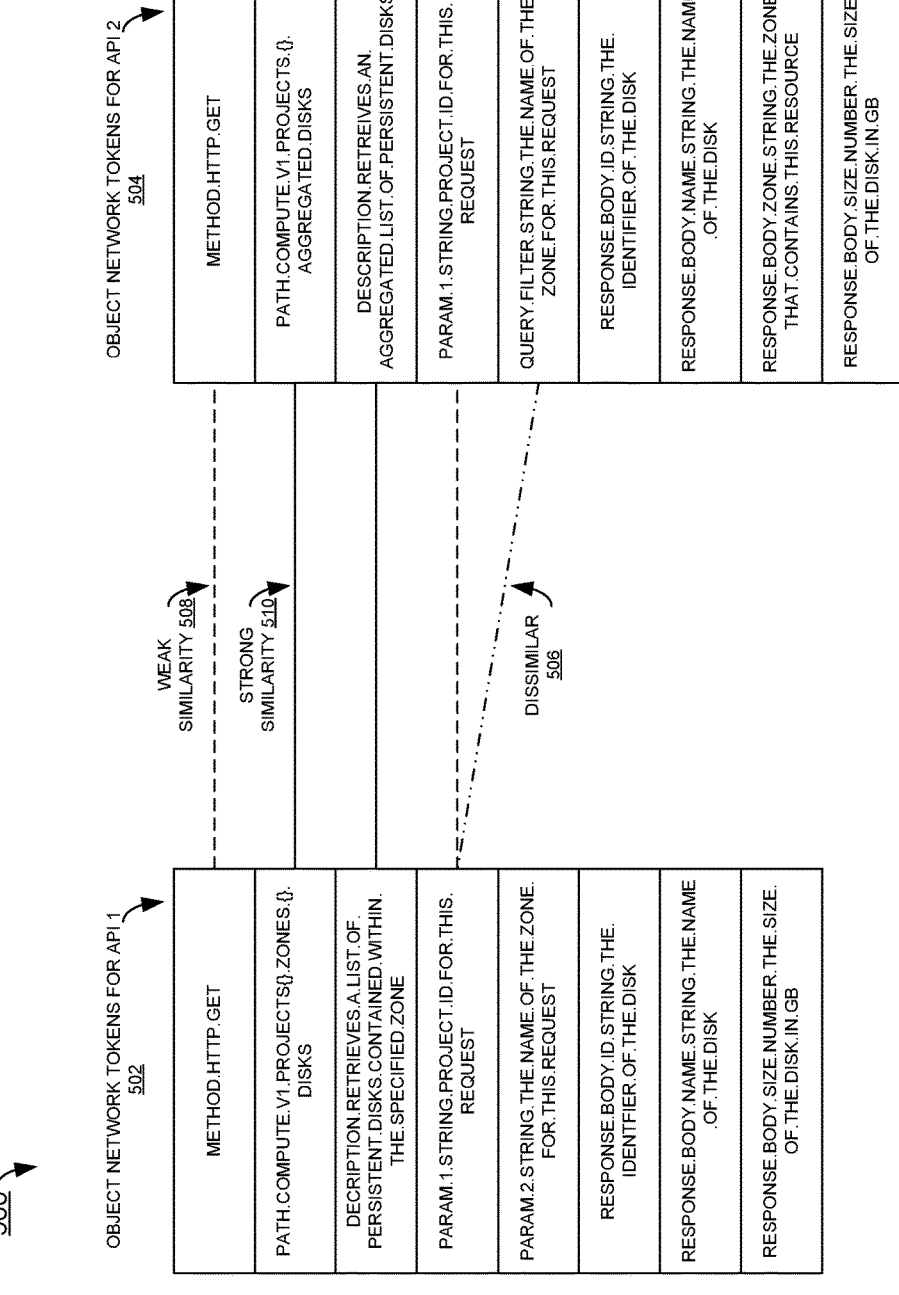
FIG. 5 illustrates an example similarity determination that can facilitate promoting APIs based on usage, in accordance with an embodiment of this disclosure.

FIG. 5 illustrates an example similarity determination 500 that can facilitate promoting APIs based on usage, in accordance with an embodiment of this disclosure. In some examples, part(s) of similarity determination 500 can be implemented by promoting APIs based on usage component 108 of FIG. 1 to facilitate promoting APIs based on usage.

Similarity determination 500 comprises object network tokens for API 1 502. object network tokens for API 2 504, and weights between respective tokens (E.g., dissimilar 506, weak similarity 508, and strong similarity 510—note that in this example, few weights between tokens have been shown for purposes of clarity). Each of object network tokens for API 1 502 and object network tokens for API 2 504 can be similar to object network tokens for API 404 of FIG. 4, and can represent a different API (e.g., represent API 1 and API 2, respectively).

In an example, consider the comparison of the two APIs (e.g., represented by object network tokens for API 1 502 and object network tokens for API 2 504) that are similar in the way that they present mostly the same data, but differ primarily in the way the zone of the resource may be used. Similarities between the path name and description can show a strong similarity, as with the comparisons between the direct data and the zone data. Relations between tokens such as the method and project ID parameter can be weaker, since it can be that many APIs share this similarity. It can be that relations between tokens of significantly different groups, such as tokens describing the method and tokens describing parameters, are not relevant and are be weighted below this. Finally, the rest of the relations can be identified as not similar. The collection of relations can be balanced and aggregated together, and a final score can rank the similarity between the APIs—showing in this case that the two APIs should be similar.

How users use a given API (e.g., the users' actions, input, and corresponding output) can be used in interpreting to what degree two different APIs match. Some examples of users' actions can include how many times they run a particular API call, and what output information do users pull out to do further analysis.

In some examples, a variety of techniques can be implemented to create a semantic similarity weight (or score) between two sets of tokens. The tokens themselves can be scored directly with a similarity score technique, such as cosine comparisons. After each score is determined, a total score can be derived from a final comparison of the same technique. In other examples, the set of tokens together can be compared to produce a score for the total sets. For example, natural language processing techniques can be applied to the tokens where the tokens are organized as words in a corpus that contains possible API structures. In other examples, unsupervised pattern recognition, such as implemented with a neural network or a clustering technique, can produce scores that can be different values, but do describe a similarity between two objects.

Each weight can be determined, and can evolve from feedback from both internal and external users. An internal user can evaluate the graph as a view, such as while creating the API, and can help direct similarities between objects from this view. An external user can have an ability to send feedback in a form of "helpful"/"not helpful" from a user recommendation step. The weights can accept both feedbacks, and can evolve over time, which can capture relations that are not immediately apparent when an API is initially created. How feedback is processed can vary based on a technique for determining a score. For example, a supervised training data set can use newly added data, while an unsupervised technique can adjust its score using linear regression techniques.

Example Architectures

Figure 6:
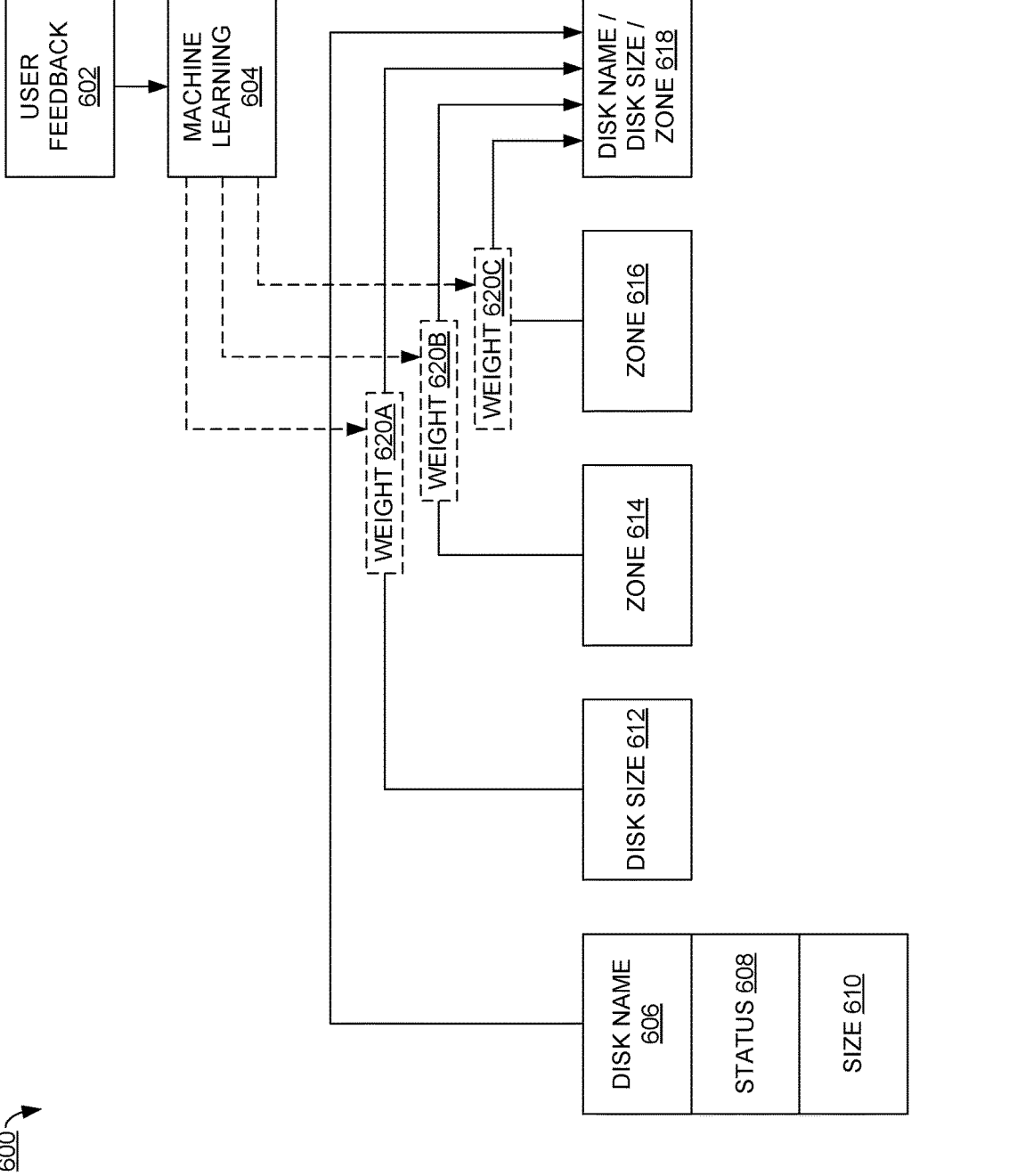
FIG. 6 illustrates another example system architecture that can facilitate promoting APIs based on usage, in accordance with an embodiment of this disclosure.

FIG. 6 illustrates another example system architecture 600 that can facilitate promoting APIs based on usage, in accordance with an embodiment of this disclosure. In some examples, part(s) of system architecture 600 can be implemented by promoting APIs based on usage component 108 of FIG. 1 to facilitate promoting APIs based on usage.

System architecture 600 comprises user feedback 602, machine learning 604, disk name 606, status 608, size 610, disk size 612, zone 614, zone 616, disk name/disk size/zone 618, weight 620A, weight 620B, and weight 620C. Disk name 606, status 608, size 610, disk size 612, zone 614, zone 616 can each be part of an object network for API 1. Disk name/disk size/zone 618 can be part of an object network for API 2. Each of weight 620A, weight 620B, and weight 620C can represent a level of similarity between objects of the object network for API 1 and objects of the object network for API 2.

User feedback 602 can be used by machine learning 604 to adjust weight 620A, weight 620B, and weight 620C.

Figure 7:
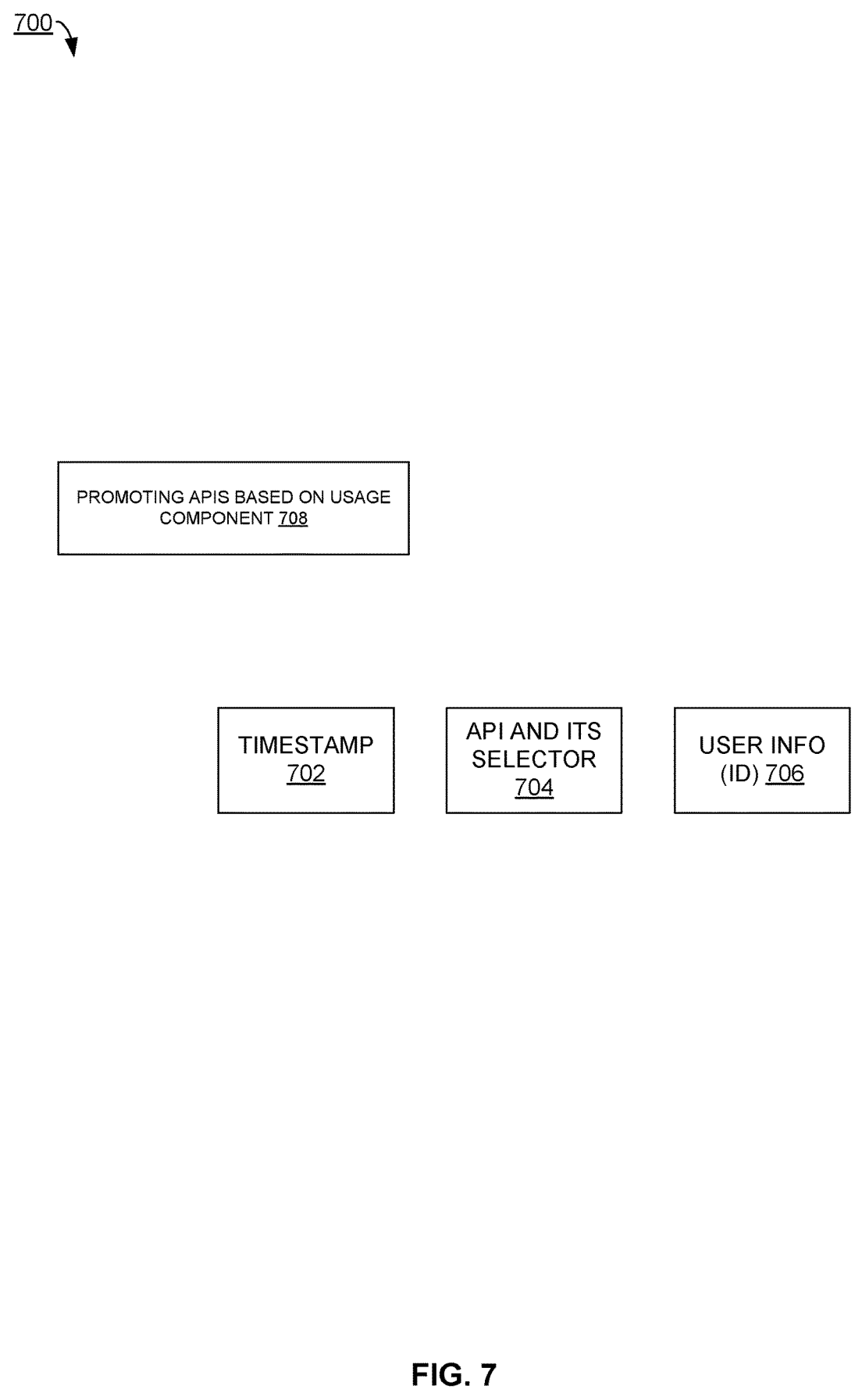

FIG. 7 illustrates another example system architecture 700 that can facilitate promoting APIs based on usage, in accordance with an embodiment of this disclosure. In some examples, part(s) of system architecture 700 can be implemented by promoting APIs based on usage component 108 of FIG. 1, and/or used by operation 218 of FIG. 2 to facilitate promoting APIs based on usage.

System architecture 700 comprises timestamp 702, API and its selector 704, user info (ID) 706, and promoting APIs based on usage component 708 (which can be similar to promoting APIs based on usage component 108 of FIG. 1).

Each of timestamp 702, API and its selector 704, and user info (ID) 706 can be sample data that is captured. Timestamp 702 can be used by promoting APIs based on usage component 708 to find APIs in particular sessions. API and its selector 704 can be used by promoting APIs based on usage component 708 to enhance and filter object graphs. User info (ID) 706 can be used by promoting APIs based on usage component 708 to understand who is using an API.

An analytics database similar to system architecture 700 can be implemented as follows. A system according to the present techniques can comprise an analytics database that tracks statistics of APIs and their usage, in a context of each user, as well as a defaulted aggregation of a system. As each API request enters the system, an asynchronous process can branch off the requests start and end to capture statistics, such as a nature of the request, an identity of a user initiating the request, and a duration of the request.

Individual requests can be further aggregated to identify a session of requests that occur in a similar timespan, and to determine average request times related to the specific user, as well as for the entire system.

Figure 8:
FIG. 8 illustrates another example system architecture that can facilitate promoting APIs based on usage, in accordance with an embodiment of this disclosure.

FIG. 8 illustrates another example system architecture 800 that can facilitate promoting APIs based on usage, in accordance with an embodiment of this disclosure. In some examples, part(s) of system architecture 800 can be implemented by promoting APIs based on usage component 108 of FIG. 1 to facilitate promoting APIs based on usage.

System architecture 800 comprises API 1 802, API 2 804, and promoting APIs based on usage component 806 (which can be similar to promoting APIs based on usage component 108 of FIG. 1). In turn, API 1 802 comprises response time per call 804A, number of calls 806A (where API 1 can be invoked three times with different filters, in this example), number of users 808A, and total time 810A; and API 2 804 comprises response time per call 804B, number of calls 806B, number of users 808B, and total time 810B.

For API 1 802, response time per call 804A, number of calls 806A, and number of users 808A can be used to determine total time 810A. Similarly, for API 2 804, response time per call 804B, number of calls 806B, and number of users 808B can be used to determine total time 810B. Then, total time 810A and total time 810B can be compared to determine which of API 1 802 and API 2 804 is superior on this metric of execution speed.

User recommendation can be handled as follows. A system according to the present techniques can evolve over time and periodically proactively forward recommends to a user. In some examples, two types of recommendations can be identified by the system. One type of recommendation can be cost reductions. The system can periodically evaluate its analytics database to identify a total cost to each session of requests, measured by an amount of time the session took. The system can then measure each requests to semantically similar requests using its object network, to determine whether a similar set of requests are possible. Then, the system can compare the similar sets together to determine a minimum cost.

Another type of recommendation can be data upgrades. The system can have new APIs over time. New APIs can be compared with the object network to identify whether the new API contains semantically similar data to other APIs. The system can then use the analytics database to determine the users of the original APIs, and forward upgrade recommendations to those users.

In some examples, each recommendation forwarded to an end user can contain an ability of the user to note the recommendation as helpful or not helpful, and this feedback can be used to determine weight adjustments to the object network.

In an example, two APIs—API 1 802 and API 2 804—can be two compared. API 1 802 and API 2 804 can be compared based on time—that is, a response time of the API calls. A number of API calls that API 1 802 uses to determine a response can take 145 minutes (min), while a similar number of calls that API 2 804 uses to determine a response can take 50 min.

API 1 802 and API 2 804 can also be compared based on cost—that is, a cost comparison based on a number of API calls made. For example, where one API call costs $0.0001, then 15,000 calls with API 1 802 can cost $1.50, and 5,000 calls with API 2 804 can cost $0.50.

Example Process Flows

FIG. 9 illustrates an example process flow 900 that can facilitate promoting APIs based on usage, in accordance with an embodiment of this disclosure. In some examples, one or more embodiments of process flow 900 can be implemented by promoting APIs based on usage component 108 of FIG. 1, or computing environment 1400 of FIG. 14.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 300 of FIG. 3, process flow 1000 of FIG. 10, process flow 1100 of FIG. 11, process flow 1200 of FIG. 12, and/or process flow 1300 of FIG. 13.

Process flow 900 begins with 902, and moves to operation 904.

Operation 904 depicts assigning respective first elements of a first API to respective first objects in a graph representation, wherein the respective objects correspond to respective syntactic representations of the first API. In some examples, this can comprise creating, for the first API, a graph that is similar to object network tokens for API 1 502 of FIG. 5, and where there are connections to other objects, such as weak similarity 508 to part of object network tokens for API 2 504.

After operation 904, process flow 900 moves to operation 906.

Operation 906 depicts determining that an action, taken with respect to a user account, has invoked a second API via an API call, wherein respective second elements of the second API are assigned to respective second objects in the graph representation. This can comprise client computer 106 of FIG. 1 sending an API call to server 102 (or to another computer, where the API call is identified by server 102).

In some examples, the API call is a first API call, the user account is engaged in a session of invoking API calls that comprises the first API call, and the API calls are determined to be part of the session based on respective timestamps of the respective API calls. That is, it can be that individual requests are aggregated to identify a session of requests that occur during a similar timespan.

After operation 906, process flow 900 moves to operation 908.

Operation 908 depicts determining that the first API satisfies a first similarity criterion with respect to the second API. This similarity criterion can be similar to that which is described with respect to similarity determination 500 of FIG. 5.

After operation 908, process flow 900 moves to operation 910.

Operation 910 depicts determining that the first API is superior to the second API according to a second criterion. In some examples, this second criterion can comprise a determined cost, time, or functionality benefit.

In some examples, the API call is a first API call, the second criterion comprises a monetary cost associated with processing API calls, and the API calls comprise the first API call. That is, cost comparisons can be made based on a number of API calls that in each API to achieve a result.

In some examples, the API call is a first API call, the second criterion comprises a speed associated with processing API calls, and the API calls comprise the first API call. That is, two APIs can be compared based on a time involved with achieving a result.

In some examples, the user account is engaged in a session of invoking API calls that comprises the first API call, and the speed associated with processing API calls is based on respective speeds of processing respective API calls of the session. In some examples, the speed is determined based on processing API calls on behalf of the first user account, and independently of processing API calls on behalf of a second user account. In some examples where the user account is a first user account, the speed is determined based on processing API calls for a group of user accounts that comprises the user account. That is, individual requests can be aggregated to identify a session of requests that occur in a similar timespan, and average request times related to a specific user, as well as for an entire system, can be determined.

After operation 910, process flow 900 moves to operation 912.

Operation 912 depicts sending, for access via the user account, an indication of the first API. This can comprise server 102 of FIG. 1 presenting in a user interface of client computer 106 an indication of suggesting to use the first API in place of the second API.

After operation 912, process flow 900 moves to 914, where process flow 900 ends.

FIG. 10 illustrates an example process flow 1000 that can facilitate promoting APIs based on usage, in accordance with an embodiment of this disclosure. In some examples, one or more embodiments of process flow 1000 can be implemented by promoting APIs based on usage component 108 of FIG. 1, or computing environment 1400 of FIG. 14.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 300 of FIG. 3, process flow 900 of FIG. 9, process flow 1100 of FIG. 11, process flow 1200 of FIG. 12, and/or process flow 1300 of FIG. 13.

Process flow 1000 begins with 1002, and moves to operation 1004.

Operation 1004 depicts assigning respective first elements of a first API to respective first objects in a graph representation, wherein the respective objects correspond to respective syntactic representations of the first API. In some examples, operation 1004 can be implemented in a similar manner as operation 904 of FIG. 9.

In some examples, the graph representation comprises respective third elements of a third API, a first element of the first elements is assigned to a first object of the first objects, a third element of the third elements is assigned to the first object, and the first element and the third element syntactically match. That is, APIs that share syntactically identical elements can point to a same object in an object network graph.

In some examples, a first element of the first elements identifies a method of the first API, a path of the first API, a description of the first API, or a response of the first API. That is, there can be various types of tokens, such as described with respect to FIG. 3.

After operation 1004, process flow 1000 moves to operation 1006.

Operation 1006 depicts determining that a user account has invoked a second API via an API call, wherein respective second elements of the second API are assigned to respective second objects in the graph representation. In some examples, operation 1006 can be implemented in a similar manner as operation 906 of FIG. 9.

In some examples, the API call is a first API call, the user account engages in a session of invoking API calls that comprises the first API call, and the API calls are determined to be part of the session based on respective selectors of the respective API calls. In some examples, the API call is a first API call, the user account engages in a session of invoking API calls that comprises the first API call, and the API calls are determined to be part of the session based on the respective API calls being associated with respective identifiers of the user account.

That is, a session of multiple API calls can be identified based on information in those API calls, such as a timestamp, a selector, or user information (like a user ID). A selector can be captured from an API call as a part of the call that adds specifics, queries, filters, etc. to the API.

After operation 1006, process flow 1000 moves to operation 1008.

Operation 1008 depicts determining that the first API has a capability not possessed by the second API according to a criterion. In some examples, operation 1008 can be implemented in a similar manner as operations 908-910 of FIG. 9.

After operation 1008, process flow 1000 moves to operation 1010.

Operation 1010 depicts sending, to the user account, an indication of the first API. In some examples, operation 1010 can be implemented in a similar manner as operation 912 of FIG. 9.

After operation 1010, process flow 1000 moves to 1012, where process flow 1000 ends.

FIG. 11 illustrates an example process flow 1100 that can facilitate promoting APIs based on usage, in accordance with an embodiment of this disclosure. In some examples, one or more embodiments of process flow 1100 can be implemented by promoting APIs based on usage component 108 of FIG. 1, or computing environment 1400 of FIG. 14.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 200 of FIG. 2, process flow 300 of FIG. 3, process flow 900 of FIG. 9, process flow 1000 of FIG. 10, process flow 1200 of FIG. 12, and/or process flow 1300 of FIG. 13.

Process flow 1100 begins with 1102, and moves to operation 1104.

Operation 1104 depicts, in response to receiving the API call, invoking an asynchronous process that captures statistics about the API call, wherein the determining that the user account has invoked the second API is based on the statistics. That is, as an API request enters a system (e.g., server 102 of FIG. 1), an asynchronous request can branch off the request's start and end to capture statistics.

After operation 1104, process flow 1100 moves to operation 1106.

Operation 1106 depicts, wherein the statistics are first statistics, and wherein the asynchronous process is a first asynchronous process, after processing the API call, invoking a second asynchronous process that captures second statistics about the API call, wherein the determining that the user account has invoked the second API is based on the second statistics. That is, an asynchronous request can branch off for each API call.

After operation 1106, process flow 1100 moves to 1108, where process flow 1100 ends.

FIG. 12 illustrates an example process flow 1200 that can facilitate promoting APIs based on usage, in accordance with an embodiment of this disclosure. In some examples, one or more embodiments of process flow 1200 can be implemented by promoting APIs based on usage component 108 of FIG. 1, or computing environment 1400 of FIG. 14.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 200 of FIG. 2, process flow 300 of FIG. 3, process flow 900 of FIG. 9, process flow 1000 of FIG. 10, process flow 1100 of FIG. 11, and/or process flow 1300 of FIG. 13.

Process flow 1200 begins with 1202, and moves to operation 1204.

Operation 1204 depicts assigning respective first elements of a first API to respective first objects in a graph representation. In some examples, operation 1204 can be implemented in a similar manner as operation 904 of FIG. 9.

After operation 1204, process flow 1200 moves to operation 1206.

Operation 1206 depicts determining that an invocation of a second API has occurred via an API call associated with a user account, wherein respective second elements of the second API are assigned to respective second objects in the graph representation. In some examples, operation 1206 can be implemented in a similar manner as operation 906 of FIG. 9.

After operation 1206, process flow 1200 moves to operation 1208.

Operation 1208 depicts determining that the first API is more capable than the second API according to a criterion. In some examples, operation 1208 can be implemented in a similar manner as operations 908-910 of FIG. 9.

In some examples, the criterion identifies a similarity between the first API and with the second API. This can be a similarity of substance rather than a syntactic similarity (which, in some examples, describes only whether two objects have a same structure).

In some examples, the criterion corresponds to a weight of an edge of the graph representation between a first object of the first objects and a second object of the second objects. In some examples, the criterion corresponds to a weight of the graph representation, and wherein the weight is determined based on respective weights assigned to respective edges between the respective first objects and the respective second objects. That is, from a set of objects, a graph can be created that links every object to every other object, based on a weight that represents the semantic similarity of the two objects.

After operation 1208, process flow 1200 moves to operation 1210.

Operation 1210 depicts sending an indication of the first API to be accessed via the user account. In some examples, operation 1210 can be implemented in a similar manner as operation 912 of FIG. 9.

After operation 1210, process flow 1200 moves to 1212, where process flow 1200 ends.

Figure 13:
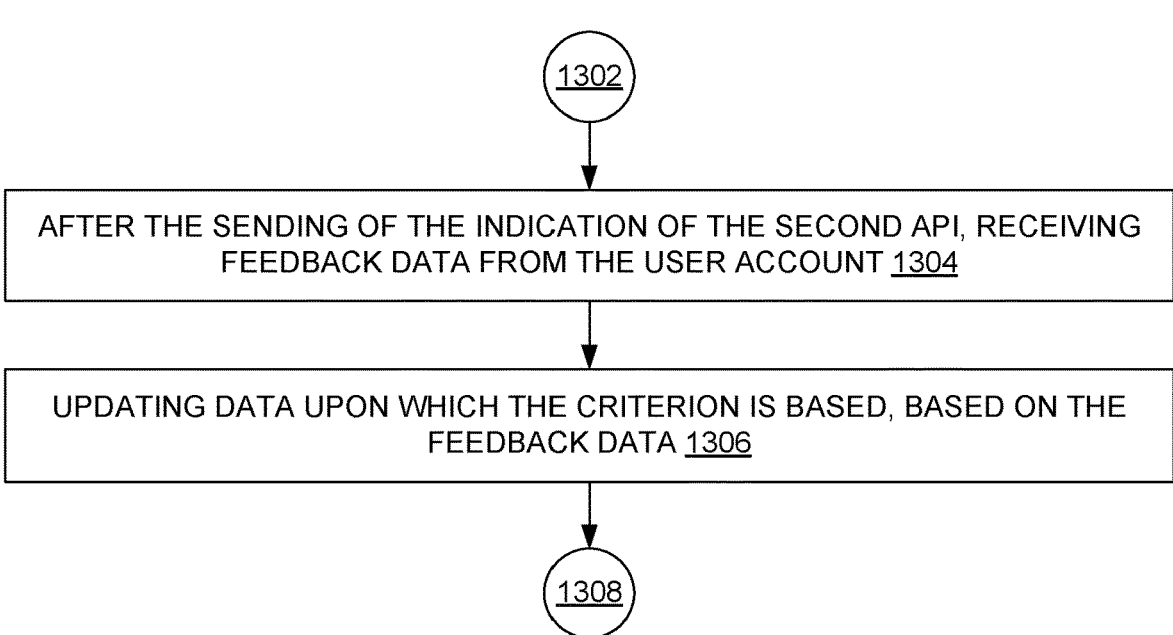
FIG. 13 illustrates another example process flow that can facilitate promoting APIs based on usage, in accordance with an embodiment of this disclosure.

FIG. 13 illustrates an example process flow 1300 that can facilitate promoting APIs based on usage, in accordance with an embodiment of this disclosure. In some examples, one or more embodiments of process flow 1300 can be implemented by promoting APIs based on usage component 108 of FIG. 1, or computing environment 1400 of FIG. 14.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 200 of FIG. 2, process flow 300 of FIG. 3, process flow 900 of FIG. 9, process flow 1000 of FIG. 10, process flow 1100 of FIG. 11, and/or process flow 1200 of FIG. 12.

Process flow 1300 begins with 1302, and moves to operation 1304.

Operation 1304 depicts, after the sending of the indication of the second API, receiving feedback data from the user account. This can be, for example, microfeedback like receiving microfeedback in operation 306 of FIG. 3.

After operation 1304, process flow 1300 moves to operation 1306.

Operation 1306 depicts updating data upon which the criterion is based, based on the feedback data. That is, weights in a graph can be determined, and can be changed over time based on feedback received from user accounts.

In some examples, the criterion corresponds to a weight of an edge of the graph representation between a first object of the first objects and a second object of the second objects, and updating the data comprises updating the weight.

After operation 1306, process flow 1300 moves to 1308, where process flow 1300 ends.

Example Operating Environment

In order to provide additional context for various embodiments described herein, FIG. 14 and the following discussion are intended to provide a brief, general description of a suitable computing environment 1400 in which the various embodiments of the embodiment described herein can be implemented.

For example, parts of computing environment 1400 can be used to implement one or more embodiments of server 102 and/or client computer 106 of FIG. 1.

In some examples, computing environment 1400 can implement one or more embodiments of the process flows of FIGS. 2-3 and 9-13 to facilitate promoting APIs based on usage.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile storage such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.).

While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples, and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory coupled to the processor, comprising instructions that, in response to execution by the at least one processor, cause the system to perform operations, comprising:
assigning respective first elements of a first application programming interface (API) to respective first objects in a graph representation, wherein the respective objects correspond to respective syntactic representations of the first API;
determining that an action, taken with respect to a first user account, has invoked a second API via an API call, wherein respective second elements of the second API are assigned to respective second objects in the graph representation;
determining that the first API satisfies a first similarity criterion with respect to the second API;
determining that the first API is superior to the second API according to a second criterion, wherein the second criterion is a function of a speed associated with processing API calls, wherein the API calls comprise the API call,
wherein the first user account is engaged in a session of invoking the API calls, wherein the speed associated with processing the API calls is a function of respective speeds of processing respective API calls of the session, and
wherein the speed is determined based on processing the API calls on behalf of the first user account, and independently of processing other API calls on behalf of a second user account, or wherein the speed is determined based on processing a group of API calls for a group of user accounts that comprises the first user account; and
sending, for access via the first user account, an indication of the second API.

2. The system of claim 1, wherein the second criterion is further a function of a monetary cost associated with processing the API calls.

3. The system of claim 1, wherein the first user account is engaged in a session of invoking the API calls, and wherein the API calls are determined to be part of the session based on respective timestamps of the respective API calls.

4. A method, comprising:
assigning, by a system comprising at least one processor, respective first elements of a first application programming interface (API) to respective first objects in a graph representation, wherein the respective objects correspond to respective syntactic representations of the first API;
determining, by the system, that a first user account has invoked a second API via an API call, wherein respective second elements of the second API are assigned to respective second objects in the graph representation;
determining, by the system, that the first API has a capability not possessed by the second API according to a criterion, wherein the criterion is evaluated with respect to a speed associated with processing API calls, wherein the API calls comprise the API call,
wherein the first user account is engaged in a session of invoking the API calls, wherein the speed associated with processing the API calls is based on respective speeds of processing respective API calls of the session, and
wherein the speed is determined while processing the API calls on behalf of the first user account, and independently of processing API calls on behalf of a second user account, or wherein the speed is determined while processing a group of API calls for a group of user accounts that comprises the first user account; and
sending, by the system to the first user account, an indication of the second API.

5. The method of claim 4, further comprising:
in response to receiving the API call, invoking, by the system, an asynchronous process that captures statistics about the API call, wherein the determining that the first user account has invoked the second API is based on the statistics.

6. The method of claim 5, wherein the statistics are first statistics, wherein the asynchronous process is a first asynchronous process, and further comprising:
after processing the API call, invoking, by the system, a second asynchronous process that captures second statistics about the API call, wherein the determining that the first user account has invoked the second API is based on the second statistics.

7. The method of claim 4, wherein the first user account engages in a session of invoking the API calls, and wherein the API calls are determined to be part of the session based on respective selectors of the respective API calls.

8. The method of claim 4, wherein the first user account engages in a session of invoking the API calls, and wherein the API calls are determined to be part of the session based on the respective API calls being associated with respective identifiers of the first user account.

9. The method of claim 4, wherein the graph representation comprises respective third elements of a third API, wherein a first element of the first elements is assigned to a first object of the first objects, wherein a third element of the third elements is assigned to the first object, and wherein the first element and the third element syntactically match.

10. The method of claim 4, wherein a first element of the first elements identifies a method of the first API, a path of the first API, a description of the first API, or a response of the first API.

11. The method of claim 4, wherein the criterion is further evaluated with respect to a monetary cost associated with processing the API calls.

12. The method of claim 4, wherein the first user account is engaged in a session of invoking the API calls, and wherein the API calls are determined to be part of the session based on respective timestamps of the respective API calls.

13. A non-transitory computer-readable medium comprising instructions that, in response to execution, cause a system comprising at least one processor to perform operations, comprising:

assigning respective first elements of a first application programming interface (API) to respective first objects in a graph representation;

determining that an invocation of a second API has occurred via an API call associated with a first user account, wherein respective second elements of the second API are assigned to respective second objects in the graph representation;

determining that the first API is more capable than the second API according to a criterion, wherein the criterion comprises a speed criterion associated with a speed of processing API calls, wherein the API calls comprise the API call, wherein the first user account is engaged in a session of invoking the API calls, wherein the speed associated with processing the API calls corresponds to respective speeds of processing respective API calls of the session, and wherein the speed is determined based on processing the API calls on behalf of the first user account, and independently of any processing of API calls on behalf of a second user account, or wherein the speed is determined based on processing a group of API calls for a group of user accounts that comprises the first user account; and sending an indication of the second API to be accessed via the first user account.

14. The non-transitory computer-readable medium of claim 13, wherein the criterion identifies a similarity between the first API and with the second API.

15. The non-transitory computer-readable medium of claim 13, wherein the criterion corresponds to a weight of an edge of the graph representation between a first object of the first objects and a second object of the second objects.

16. The non-transitory computer-readable medium of claim 13, wherein the criterion corresponds to a weight of the graph representation, and wherein the weight is determined based on respective weights assigned to respective edges between the respective first objects and the respective second objects.

17. The non-transitory computer-readable medium of claim 13, wherein the operations further comprise:

after the sending of the indication of the second API, receiving feedback data from the first user account; and updating data upon which the criterion is based, based on the feedback data.

18. The non-transitory computer-readable medium of claim 17, wherein the criterion corresponds to a weight of an edge of the graph representation between a first object of the first objects and a second object of the second objects, and wherein updating the data comprises updating the weight.

19. The non-transitory computer-readable medium of claim 13, wherein the criterion comprises a monetary cost criterion associated with a monetary cost of processing the API calls.

20. The non-transitory computer-readable medium of claim 13, wherein the first user account is engaged in a session of invoking the API calls, and wherein the API calls are determined to be part of the session based on respective timestamps of the respective API calls.

* * * * *